J. A. ALVEY.
BEARING FOR CONVEYER ROLLERS.
APPLICATION FILED FEB. 13, 1914.

1,141,515.

Patented June 1, 1915.

Witnesses:
Edgar J. Farmer
N. W. Preston

Inventor:
John A. Alvey,
By Camot Cam
his Attys.

UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI, A CORPORATION OF MISSOURI.

BEARING FOR CONVEYER-ROLLERS.

1,141,515.

Specification of Letters Patent.

Patented June 1, 1915.

Application filed February 13, 1914. Serial No. 818,453.

*To all whom it may concern:*

Be it known that I, JOHN A. ALVEY, a citizen of the United States, and a resident of the city of St. Louis and State of Missouri, have invented a new and useful Improvement in Bearings for Conveyer-Rollers, of which the following is a specification.

My invention relates to bearings for supporting the ends of rollers, and particularly to that type of roller employed with gravity conveyers; although most of its advantages may be obtained when it is used in other connections.

The principal object of my invention is to provide a bearing for the ends of rollers which will be strong and durable and which may be easily and cheaply manufactured.

A further object is to attain certain other advantages which will be more fully set forth hereinafter.

The invention consists in the parts, and in the arrangements and combinations of parts which will more fully appear hereinafter.

Figure 1:
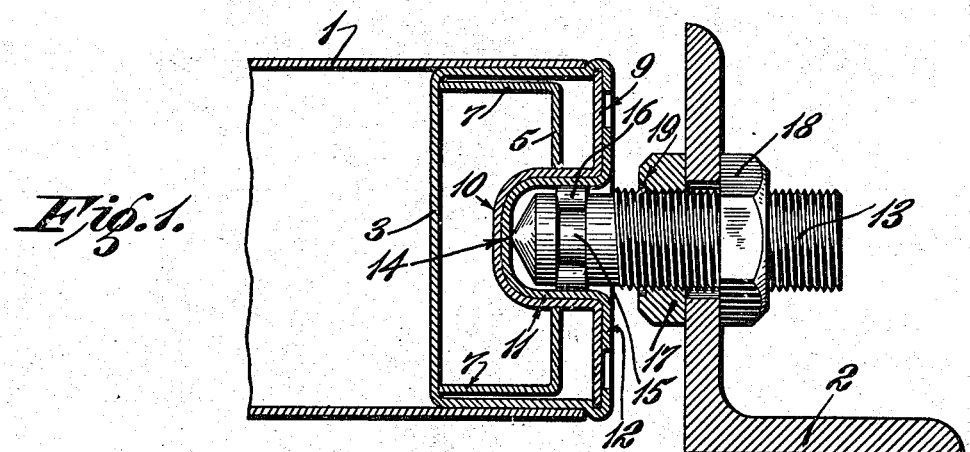
Figure 2:
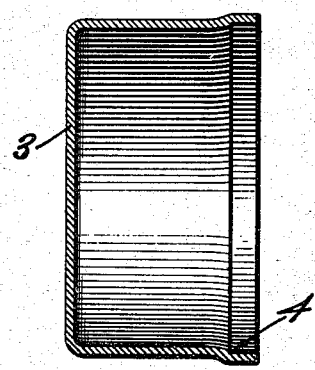
Figure 3:
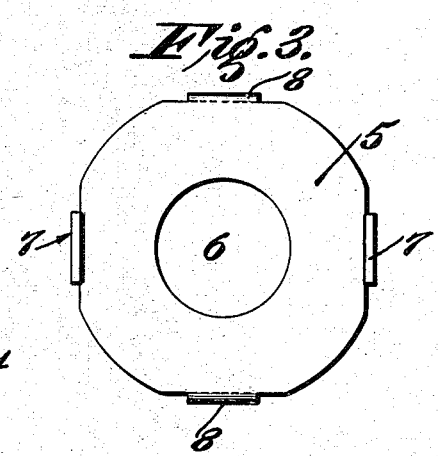
Figure 4:
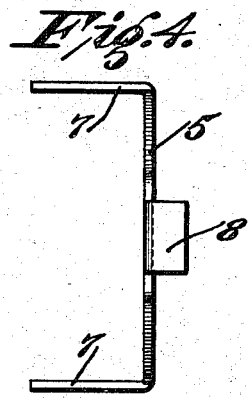
Figure 5:
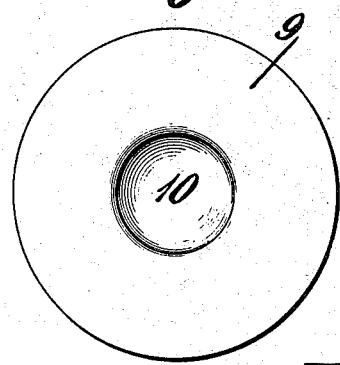
Figure 6:
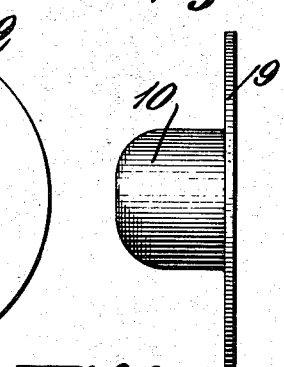
Figures 7, 8:
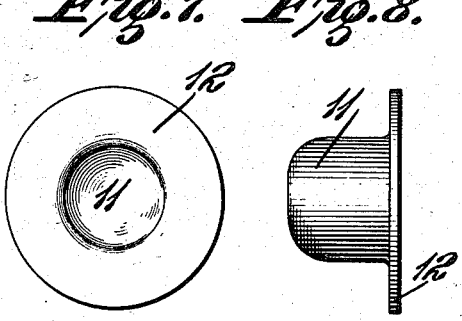
Figure 9:
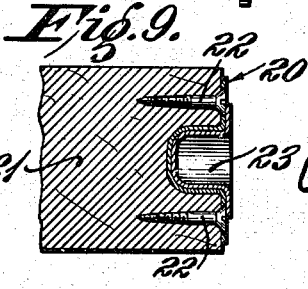

In the accompanying drawings, which form part of the specification, and in which like reference characters refer to like parts throughout the several views, Figure 1 is a fragmentary vertical longitudinal section through a bearing embodying my invention, showing it applied to one end of a roller; Fig. 2 is a diametrical section of the cup forming part of the bearing shown in Fig. 1, showing the form of this cup before the parts are assembled; Fig. 3 is a top plan view of the spacing member forming part of the bearing shown in Fig. 1, showing it detached from the other parts; Fig. 4 is a side view of the spacing member shown in Fig. 3; Fig. 5 is a top plan view of the cap forming part of the bearing shown in Fig. 1, showing it detached from the other parts; Fig. 6 is a side view of the cap shown in Fig. 5; Fig. 7 is a top plan view of the bearing cup which forms part of the bearing shown in Fig. 1, showing it detached from the other parts; Fig. 8 is a side view of the bearing cup shown in Fig. 7; and Fig. 9 is a diametrical section of a modified form of construction embodying my invention, showing it applied to a wooden roller.

For the purpose of illustration, the preferred form of construction embodying the invention, as illustrated in Figs. 1 to 8, is shown in connection with a tubular roller 1, supported at each end by an angle iron 2; but the invention is not limited to this exact construction. The bearing and its associated parts for one end of the roller are shown, and it is to be understood that the construction illustrated is duplicated for the other end of the roller.

Mounted within the end of the roller 1 is a cup 3. The cup 3 is preferably of soft steel, and in its shape before it is mounted in the roller 1, it is slightly tapered outward from the bottom to the edge, so that when it is forced into the end of the roller it will fit tightly therein. The cup 3, in its shape before the parts of the bearing are assembled, has a narrow enlargement on its edge forming a shoulder 4 on its inside circumferential face near the edge. In the cup 3 is a spacing member 5, annular in shape, and having in its center a circular hole 6. The annular body portion of the spacing member 5 is located between the bottom and the edge of the cup 3. The spacing member 5 has integral therewith a pair of legs 7 which are arranged at diametrically opposite points at the outer edge of the spacing member and which rest upon the bottom of the cup 3. The spacing member 5 is preferably of spring steel, and in its shape before the parts of the bearing are assembled, the legs 7 spread apart slightly at their ends so that when the spacing member is positioned in the cup 3 the legs 7 will fit tightly against the walls of said cup. Integral with the spacing member 5 are lugs 8 which are arranged at diametrically opposite points on the edge of said spacing member at right angles to said legs 7, and which extend in the opposite direction to said legs.

Within the circumferential edge of the cup 3 is a cap 9 which rests upon the lugs 8 and the shoulder 4, and which is formed with a concave portion 10 in its center. The edge of the cup 3 is bent to form a crimp overlying the circumferential edge of the cap 9. Within the concave portion 10 of the cap 9 is a circular bearing cup 11 having an annular flange 12 engaging the outer face of the cap 9. The bearing cup 11 is of hardened steel and is pressed tightly into the concave portion 10.

The roller 1 is supported by a bearing spindle 13 mounted in the angle iron 2. One end of the bearing spindle 13 is tapered to a point 14 which engages the bottom of the bearing cup 11. The end of the bearing spindle 13, adjacent to the point 14, is formed with a circumferential groove or raceway 15 in which are bearing rollers 16 engaging the walls of the bearing cup 11. The major part of the bearing spindle 13 is screw-threaded and passes loosely through a hole in the angle iron 2. Upon the bearing spindle 13 are nuts 17 and 18. One nut 17 engages the face of the angle iron 2 which faces the roller 1, and the other nut 18 engages the other face of said angle iron. The nut 17 is formed with a shallow circular recess 19 in one face, which is arranged to receive the ends of the bearing rollers 16 when the nut is adjacent to said bearing rollers.

In the modification shown in Fig. 9, the cap 20 corresponding to the cap 9 is fastened to the end face of a wooden roller 21 by screws 22. A bearing cup 23 is secured in a concave portion in the cap 20 and is mounted upon a bearing spindle in the same manner as in the preferred form of construction.

The bearing spindle 13 may be adjusted in the angle iron 2 by manipulating the nuts 17 and 18. When the nuts 17 and 18 are jammed tightly against the faces of the angle iron 2, the bearing spindle 13 is held fixed in position. The bearing cup 11, which is the part subjected to wear, may be cheaply made of hardened steel and can be easily replaced when it is worn. The spacing member 5 holds the cap 9 in position when the edge of the cup 3 is crimped over it, and also supports the walls of the concave portion 10 of the cap 9. The bearing rollers 16 are loose in the groove 15 in the bearing spindle 13, but the nut 17 may be screwed up to position the recess 19 over the ends of these bearing rollers and hold them in place. This permits the bearing spindle 13 to be inserted in the bearing cup 11 without difficulty.

The construction which I have shown and described may be considerably modified without departing from my invention, and I do not wish my invention to be limited to this exact construction.

What I claim is:

1. In a bearing for conveyer rollers, a tubular roller, a cup fastened in each end of said roller, a cap secured to the edge of said cup, a smaller bearing cup secured to said cap, a spindle adjustably supported at each end of said roller, and antifriction members between the walls of each bearing cup and the corresponding spindle.

2. In a bearing for conveyer rollers, a cup, an annular spacing member within said cup having legs engaging the bottom of said cup and lugs extending toward the edge of said cup, a cap secured to the edge of said cup and having a concave portion supported in said spaced member, a bearing cup removably secured in said concave portion, and adapted to receive one end of a spindle.

3. In a bearing for conveyer rollers, a roller having a bearing cup secured to each end, a bearing spindle supported at each end of said roller and having one end extending into said cup, antifriction members between each cup and said end of its corresponding spindle, and a nut on said spindle having a recess in one face thereof adapted to engage said antifriction members and to hold them in position.

4. In a bearing for conveyer rollers, a tubular roller, a cup pressed into each end of said roller, a spacing member within each cup having legs engaging the bottom thereof, a cap having a concave portion supported by each spacing member, the edge of each cup being crimped over the edge of the corresponding cap, and a bearing cup of hardened steel removably mounted in said concave portion of each cap.

5. In a bearing for conveyer rollers, a roller, a cap secured to each end of said roller and having a concave portion therein, a bearing cup of hardened steel removably supported in said concave portion of each cap, said bearing cup having an imperforate bottom, a spindle adjustably supported at each end of said roller, each of said spindles being pointed at one end and engaging the bottom of the corresponding bearing cup, and antifriction members between the walls of each bearing cup and the corresponding spindle 6. In a bearing for conveyer rollers, a tubular roller, a cup pressed into each end of said roller, a cap secured to the edge of each cup and having a concave portion therein, a spacing member supporting the walls of each concave portion, and a hardened metal bearing cup removably supported in each concave portion.

Signed at St. Louis, Missouri, this 11th day of February, 1914.

JOHN A. ALVEY.

Witnesses:
 NEIL D. PRESTON,
 MARTHA A. SHELTON.